March 24, 1959 F. E. MUNSCHAUER, JR 2,878,909
POWER PRESS DRIVE MECHANISM
Filed Sept. 19, 1956 2 Sheets-Sheet 1

INVENTOR.
Frederick E. Munschauer, Jr.
BY
Bean, Brooks, Buckley & Bean
ATTORNEYS March 24, 1959     F. E. MUNSCHAUER, JR     2,878,909
POWER PRESS DRIVE MECHANISM
Filed Sept. 19, 1956                                            2 Sheets-Sheet 2
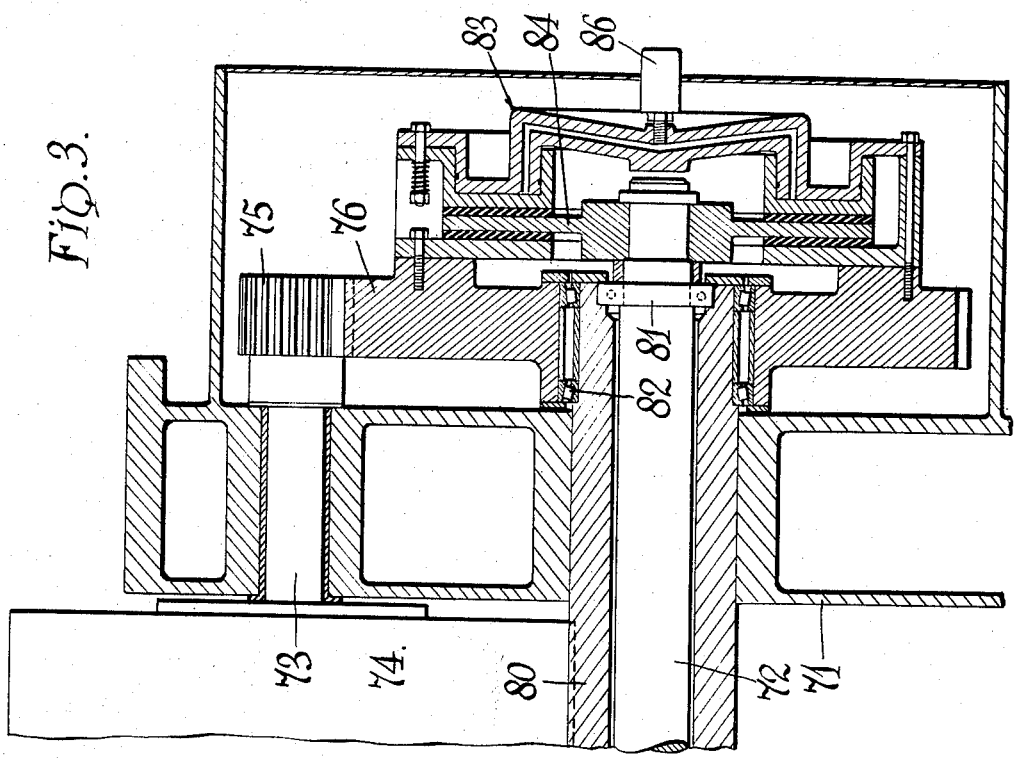
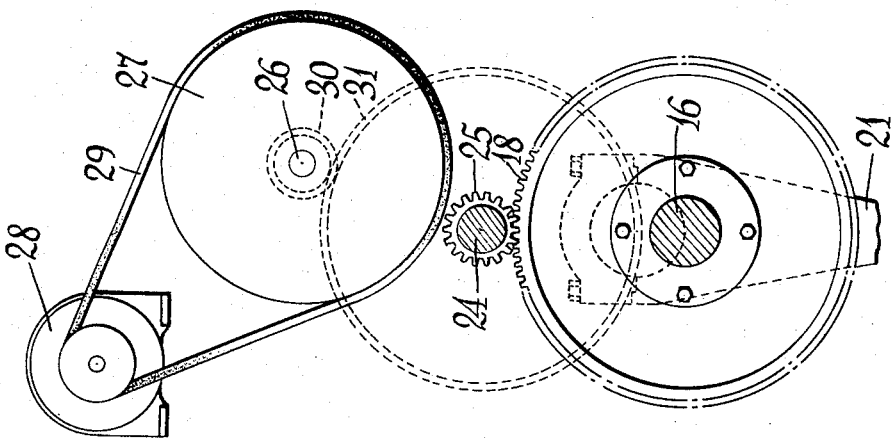
INVENTOR
Frederick E. Munschauer, Jr.,
BY
Bean, Brooks, Buckley & Bean
ATTORNEYS.

United States Patent Office 2,878,909
Patented Mar. 24, 1959

2,878,909

POWER PRESS DRIVE MECHANISM

Frederick E. Munschauer, Jr., Eggertsville, N.Y., assignor to Niagara Machine & Tool Works, Buffalo, N.Y.

Application September 19, 1956, Serial No. 610,767

10 Claims. (Cl. 192—3.5)

This invention relates to mechanical power presses and particularly to drive transmission means and a novel drive transmission arrangement for such presses.

In transmitting driving torque from a continuously rotating driving motor to the generally intermittently rotating crankshaft or eccentric shaft of a power press it is common to carry the drive through several shafts to effect a substantial speed reduction from the motor shaft to the final shaft. Furthermore, in such driving torque transmitting arrangements various bearing and gear connection arrangements have heretofore been proposed and employed, as well as a variety of flywheel and clutch locations and dispositions.

The present invention provides a very simple drive arrangement in which the shaft bearing supports and locations and the gear connections are such that the torque transmission is accomplished with greatly increased efficiency and effectiveness and with a minimum of shaft deflection, both torsional and flexural. Furthermore, in the arrangement of the press drive of the present invention the clutch mechanism is mounted outboard of the frame support at one side of the press in such manner that it is readily accessible and readily removable without disturbing the transmission generally or other parts of the press, when removal of the clutch for servicing or repair is required.

The drive transmission arrangement of the present invention involves, essentially, a flywheel shaft, an intermediate clutch shaft, and a crankshaft. The flywheel shaft is a short shaft with a single central bearing in a side frame portion of the press, a flywheel fixed thereto at the inboard side of the bearing, and a drive pinion fixed thereto at the outboard side of the bearing. The intermediate shaft is bearing supported in the same side frame portion as the flywheel shaft and also in a central bearing structure. A clutch gear is rotatable on or relative to the intermediate shaft and is disposed coaxial therewith and just outwardly of the side frame portion to mesh with the flywheel shaft pinion. The clutch mechanism is located just outwardly of this clutch gear, acting between the same and the outboard end of the coaxial intermediate shaft.

The final drive shaft of the press is a double crankshaft with a drive gear fixed centrally thereof between the two crank throws, there being a pinion fixed to the inboard end of the intermediate shaft meshing with the crankshaft drive gear. The crankshaft is bearing supported in the two side portions of the press framing structure as well as in the aforesaid central bearing structure at opposite sides of the crankshaft drive gear. Thus the crankshaft is bearing supported at both sides of each load point, namely each of the two crank throws and the central drive gear, and the distances along the shaft from the point of torque application to the crank throws is an absolute minimum, with a resultant minimum torsional deflection.

The apparatus of the present invention provides a low inertia clutch arrangement wherein the intermittently operating parts, from the driven member of the clutch to the final crankshaft, represents a minimum of mass to be started and stopped during each machine cycle. This reduction in starting and stopping inertia results from the clutch arrangement itself, the reduced length of the intermediate shaft, and the requirement of only a single gear and pinion between the intermediate shaft and the crankshaft. With an end driven crankshaft in a double crank press it would normally be necessary to use gear connections between both ends of the crankshaft and the intermediate shaft, since gears at only one end would result in too great a degree of torsional deflection of the crankshaft.

This elimination of an extra pair of gears normally required in driving a double crank press represents an obvious economy and the overall reduction of starting and stopping inertia results in less wear on the clutch and brake and less heat generation, thus requiring less provision for heat dissipation.

With a crankshaft driven at both ends, as in prior art double crank presses, overhung gears are usually employed to meet general design requirements, thus limiting the torque transmitting capacity of the individual gears. Furthermore, the final center drive arrangement of the transmission combination of the present invention leaves the ends of the crankshaft free for the attachment thereto or association therewith of timing gears, timing cams and the like for operating automatic feeds, limit switches for controlling press cycles, and automation limit switches for controlling a wide variety of automation devices and accessories which must be synchronized with operating cycles of the press.

Other objects and advantages of the drive arrangement of the present invention, as to structural efficiency and effectiveness, economy of manufacture, and facility of assembly and accessibility for repair, replacement or adjustment, will appear to those skilled in the present art from a consideration of the following detailed description of two embodiments thereof taken in conjunction with the accompanying drawings. However, it is to be understood that the specific embodiments shown and described are by way of example only and that the principles of the present invention are limited only as defined in the appended claims.

In the drawings:

Fig. 2 is a fragmentary side elevational view, partly in cross section, of the drive means of Fig. 1; and Fig. 3 is a fragmentary cross sectional view of a modified form of a portion of the drive means of the present invention, viewed similarly to Fig. 1 but on a larger scale.

Figure 1:
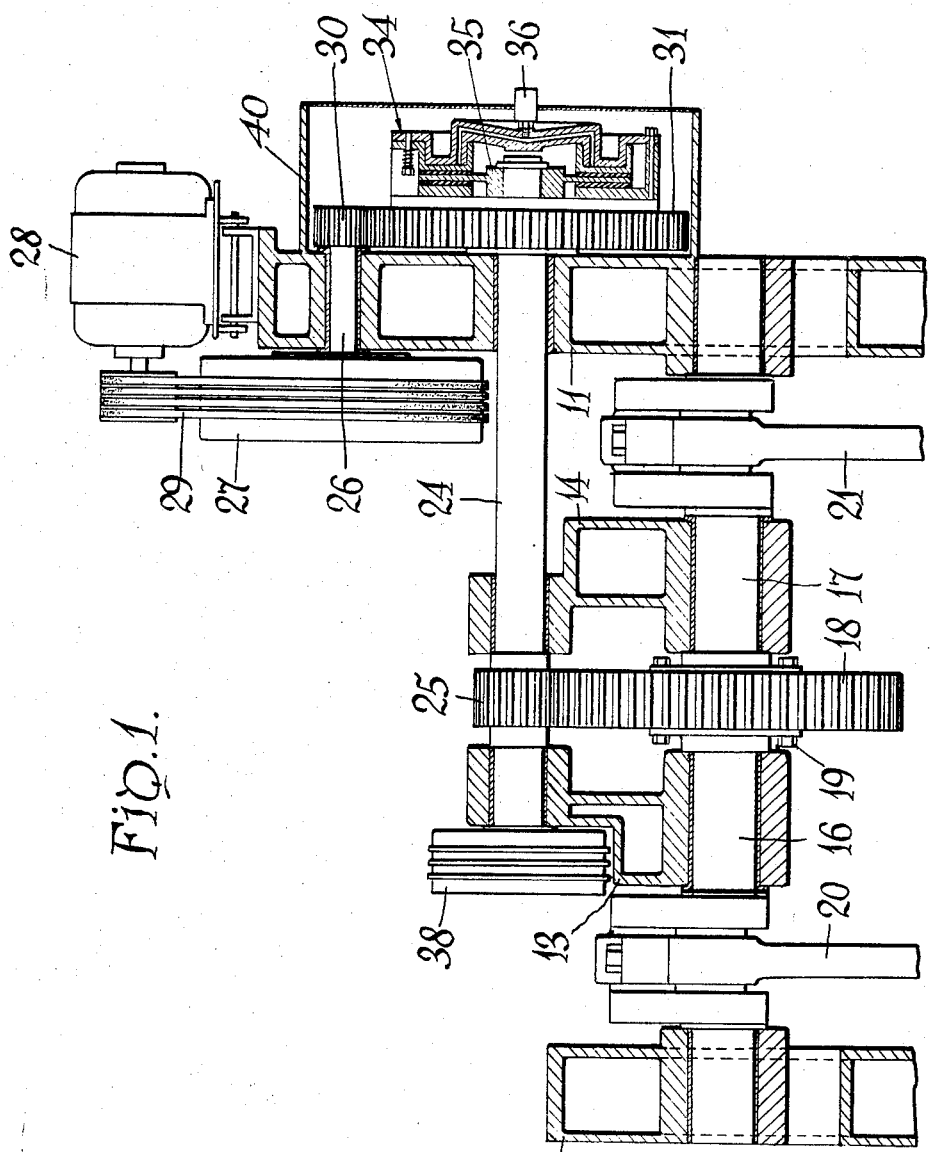
Fig. 1 is a fragmentary cross sectional view on a generally vertical plane through the superstructure or crown of a power press embodying one form of the drive means of the present invention.

Like characters of reference denote like parts in the several figures of the drawings and, referring particularly to Fig. 1, the numerals 10 and 11 designate the upper portions of a pair of side frame members which, by way of example, may comprise the usual side columns of a straight side double crank power press of the type which is widely used in sheet metal stamping, drawing and other fabricating. Apart from the drive and transmission means which is shown and described herein and which forms the subject matter of the present invention the press may be entirely conventional.

The frame portions 10 and 11 may comprise the upper portions of the side columns or side frame members of the power press or they may comprise opposite side portions of a separate rigid crown assembly which surmounts the conventional side columns or side frame members of a press. Power presses of the straight side type are conventionally made either with a separate crown member which bridges the side columns or with side columns which extend upwardly to give bearing support to the drive means.

A pair of spaced bearing supporting formations 13 and 14 may form an integral part of a general crown member, including the portions 10 and 11, or may be attached to the general framework of the machine in any conventional or convenient manner.

In the form illustrated in Figs. 1 and 2 by way of example, the final crankshaft assembly of the press comprises a pair of separate crankshaft members 16 and 17 which are bolted to a center bull gear or crankshaft drive gear 18, as at 19, to form a unitary double throw crankshaft unit. The crank throws connect with the reciprocating slide of the press (not shown) by way of pitmans or connecting rods 20 and 21. The bearing formations in the portions 10 and 11 and the formations 13 and 14 which receive the journal portions of the crankshafts 16 and 17 may be provided with removable bearing caps in various conventional ways which are not important to the principles of the present invention and will readily be apparent to those skilled in the power press art.

The formations 13 and 14 and the side portion 11 are further provided with bearings for rotatably supporting an intermediate shaft 24 which carries a pinion 25 meshing with bull gear 18. Side framing portion 11 is further provided with a bearing formation which rotatably receives a flywheel shaft 26 and in the present instance a flywheel 27 fixed to shaft 26 is belt driven from an electric driving motor 28 as at 29, the motor 28 being supported upon side frame portion 11 as shown in Fig. 1.

A pinion 30 fixed to flywheel shaft 26 engages a gear 31 which is mounted for free rotation on intermediate shaft 24 and a readily engageable and disengageable clutch means, designated generally by the numeral 34, acts between driving gear 31 and intermediate shaft 24 to selectively connect and disconnect shaft 24 and driving gear 31.

In the illustrated instance the clutch mechanism 34 is of a generally conventional air operated friction plate type wherein the clutch mechanism generally is attached to and rotates continuously with driving gear 31, with the exception of a driven disc member 35 which is fixed to intermediate shaft 24 and is coupled with the remainder of the clutch mechanism when operating air pressure is applied thereto as by means of a conduit or fitting 36.

A friction brake unit is generally indicated at 38 in Fig. 1 where it acts upon an extension of intermediate shaft 24.

In Fig. 1 the flywheel pinion, the clutch gear and the clutch are enclosed in a housing 40 which may contain a lubricant bath for these parts. Optionally, the frame portion 11 may be wide enough to provide chamber or housing means for these parts.

Reference will now be had to the modified drive arrangement shown in Fig. 3 which differs from the modification of Figs. 1 and 2 only in the fact that the gear which forms the driving component of the clutch, while still coaxial with the intermediate shaft, is not mounted for rotation directly thereon but is mounted on a fixed quill or sleeve which is rigidly supported in the frame and extends about the intermediate shaft.

By virtue of this construction the weight of the clutch driving gear and the force of tooth pressure thereagainst, and virtually all of the weight of the clutch assembly, excepting the driven disc, is not borne by the intermediate shaft but by the separate rigidly mounted coaxial quill. In fact the arrangement is such that the fixed sleeve or quill not only relieves the intermediate shaft of these forces but also provides anti-friction bearing support therefor.

Referring to Fig. 3, the right-hand frame portion corresponding to portion 11 of Fig. 1 is designated 71, the intermediate shaft is designated 72, the flywheel shaft and flywheel are designated 73 and 74, respectively, the flywheel shaft pinion is designated 75, and the meshing clutch drive gear is designated 76. A rigid quill or sleeve 80 is fixed in frame portion 71 coaxially with and loosely surrounding intermediate shaft 72 and the latter has anti-friction bearing in the quill 80 as at 81.

It is to be understood that intermediate shaft 72 will also have bearing support at the center portion of the power press as shown and described in the modification of Fig. 1. Clutch drive gear 76 is mounted for free rotation on quill 80 as by anti-friction bearing means 82. In Fig. 3 the clutch assembly is designated 83 and, as in Fig. 1, is secured to and supported by clutch drive gear 76. The only portion of the clutch supported directly by intermediate shaft 72 is the driven disc member 84 which is fixed to the intermediate shaft. As in the previous embodiment the clutch may be of the air operated type and air pressure for selectively engaging the clutch is introduced by way of an air pressure fitting 86.

I claim:

1. In a mechanical power press, a drive transmission arrangement including a pair of laterally spaced rigid transmission supporting members and a central bearing structure fixed relative to the laterally spaced supporting members and having axially spaced bearing formations therein, a double throw crankshaft journalled in said spaced supporting members and in said central bearing structure with a drive gear thereon disposed between the spaced bearings of said central bearing structure, an intermediate shaft journalled in one of said supporting members and in the spaced bearings of said central bearing structure and having a pinion thereon between the spaced bearings and meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, clutch operating means carried by the first clutch member for rotation therewith, a flywheel shaft journalled medially in said one supporting member and having a pinion fixed thereto at the outer side of its journal in said one supporting member for meshing engagement with said intermediate drive gear, a flywheel fixed to said flywheel shaft inwardly of said one supporting member, and means for imparting driving rotation to said flywheel.

2. In a mechanical power press, a drive transmission arrangement including a pair of laterally spaced rigid transmission supporting members and a central bearing structure fixed relative to the laterally spaced supporting members and having axially spaced bearing formations therein, a double throw crankshaft journalled in said spaced supporting members and in said central bearing structure with a drive gear thereon disposed between the spaced bearings of said central bearing structure, an intermediate shaft journalled in one of said supporting members and in the spaced bearings of said central bearing structure and having a pinion thereon between the spaced bearings and meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, means for selectively connecting and disconnecting said clutch members, a flywheel shaft journalled medially in said one supporting member and having a pinion fixed thereto at the outer side of the supporting member for meshing engagement with said intermediate drive gear, a flywheel fixed to said flywheel shaft inwardly of said one supporting member, and means for imparting driving rotation to said flywheel.

3. In a mechanical power press, a drive transmission arrangement including a pair of laterally spaced rigid transmission supporting members, a double throw crankshaft journalled in said spaced supporting members with a drive gear fixed to said crankshaft centrally between the throws thereof, an intermediate shaft journalled in one of said supporting members and having a pinion thereon meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, clutch operating means carried by the first clutch member for rotation therewith, a flywheel shaft journalled medially in said one supporting member and having a pinion fixed thereto at the outer side of the supporting member for meshing engagement with said intermediate drive gear, a flywheel fixed to said flywheel shaft inwardly of said one supporting member, and means for imparting driving rotation to said flywheel.

4. In a mechanical power press, a drive transmission arrangement including a pair of laterally spaced rigid transmission supporting members, a double throw crankshaft journalled in said spaced supporting members with a drive gear fixed to said crankshaft centrally between the throws thereof, an intermediate shaft journalled in one of said supporting members and having a pinion thereon meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, means for selectively connecting and disconnecting said clutch members, a flywheel shaft journalled medially in said one supporting member and having a pinion fixed thereto at the outer side of its journal in said one supporting member for meshing engagement with said intermediate drive gear, a flywheel fixed to said flywheel shaft inwardly of said one supporting member, and means for imparting driving rotation to said flywheel.

5. In a mechanical power press, a drive transmission arrangement including a pair of laterally spaced rigid transmission supporting members, a double throw crankshaft journalled in said spaced supporting members with a drive gear fixed to said crankshaft centrally between the throws thereof, an intermediate shaft journalled in one of said supporting members and having a pinion thereon meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, clutch operating means carried by the first clutch member for rotation therewith, a flywheel shaft journalled in said one supporting member and having a pinion fixed thereto at the outer side of its journal in said one supporting member for meshing engagement with said intermediate drive gear, a flywheel fixed to said flywheel shaft, and means for imparting driving rotation to said flywheel shaft.

6. In a mechanical power press, a drive transmission arrangement including a pair of laterally spaced rigid transmission supporting members, a double throw crankshaft journalled in said spaced supporting members with a drive gear fixed to said crankshaft centrally between the throws thereof, an intermediate shaft journalled in one of said supporting members and having a pinion thereon meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, means for selectively connecting and disconnecting said clutch members, a flywheel shaft journalled in said one supporting member and having a pinion fixed thereto at the outer side of the supporting member for meshing engagement with said intermediate drive gear, a flywheel fixed to said flywheel shaft, and means for imparting driving rotation to said flywheel shaft.

7. In a mechanical power press, a drive transmission arrangement including a pair of laterally spaced rigid transmission supporting members and a central bearing structure fixed relative to the laterally spaced supporting members and having axially spaced bearing formations therein, a double throw crankshaft journalled in said spaced supporting members and in said central bearing structure with a drive gear thereon disposed between the spaced bearings of said central bearing structure, an intermediate shaft journalled in one of said supporting members and in the spaced bearings of said central bearing structure and having a pinion thereon between the spaced bearings and meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, clutch operating means carried by the first clutch member for rotation therewith, a flywheel shaft journalled in said one supporting member and having a pinion fixed thereto at the outer side of the supporting member for meshing engagement with said intermediate drive gear, a flywheel fixed to said flywheel shaft, and means for imparting driving rotation to said flywheel shaft.

8. In a mechanical power press, a drive transmission arrangement including a pair of laterally spaced rigid transmission supporting members and a central bearing structure fixed relative to the laterally spaced supporting members and having axially spaced bearing formations therein, a double throw crankshaft journalled in said spaced supporting members and in said central bearing structure with a drive gear thereon disposed between the spaced bearings of said central bearing structure, an intermediate shaft journalled in one of said supporting members and in the spaced bearings of said central bearing structure and having a pinion thereon between the spaced bearings and meshing with said drive gear, an intermediate drive gear coaxial with and rotatable relative to said intermediate shaft at the outer side of said one supporting member, a clutch member fixed to said gear at its outward side and a cooperating clutch member fixed to the outer end of said intermediate shaft, means for selectively connecting and disconnecting said clutch members, a flywheel shaft journalled in said one supporting member and having a pinion fixed thereto at the outer side of the supporting member for meshing engagement with said intermediate drive gear, a flywheel fixed to said flywheel shaft, and means for imparting driving rotation to said flywheel shaft.

9. In a mechanical power press, a drive transmission arrangement including a pair of laterally spaced rigid transmission supporting members, a double throw crankshaft journalled in said spaced supporting members with a drive gear fixed to said crankshaft centrally between the throws thereof, an intermediate shaft journalled in one of said supporting members and having a pinion thereon meshing with said drive gear, an intermediate drive gear mounted for free rotation on said intermediate shaft outwardly of said one supporting member, a clutch member fixed to said gear at its outward side and a cooperating clutch member fixed to the outer end of said intermediate shaft, a flywheel shaft journalled medially in said one supporting member and having a pinion fixed thereto at the outer side of the supporting member for meshing engagement with said intermediate drive gear, a flywheel fixed to said flywheel shaft inwardly of said one supporting member, and means for imparting driving rotation to said flywheel.

10. In a mechanical power press, a drive transmission arrangement including a pair of laterally spaced rigid transmission supporting members and a central bearing structure fixed relative to the laterally spaced supporting members and having axially spaced bearing formations therein, a double throw crankshaft journalled in said spaced supporting members and in said central bearing structure with a drive gear thereon disposed between the spaced bearing of said central bearing structure, an intermediate shaft journalled in one of said supporting members and in the spaced bearings of said central bearing structure and having a pinion thereon between the spaced bearings and meshing with said drive gear, an intermediate drive gear mounted for free rotation on said intermediate shaft outwardly of said one supporting member, a clutch member fixed to said gear at its outward side and a cooperating clutch member fixed to the outer end of said intermediate shaft, a flywheel shaft journalled medially in said one supporting member and having a pinion fixed thereto at the outer side of the supporting member for meshing engagement with said intermediate drive gear, a flywheel fixed to said flywheel shaft inwardly of said one supporting member, and means for imparting driving rotation to said flywheel.

References Cited in the file of this patent

UNITED STATES PATENTS

| | | |
|---|---|---|
| 2,193,880 | Peet | Mar. 19, 1940 |
| 2,304,032 | Schmitter | Dec. 1, 1942 |
| 2,745,338 | Wissman | May 15, 1956 |